(12) United States Patent
Lun

(10) Patent No.: US 6,361,027 B1
(45) Date of Patent: Mar. 26, 2002

(54) SHOCK ABSORBER WITH FLEXIBLE CONNECTION BETWEEN AN AIRLIFT COMPONENT AND TOP MOUNT

(75) Inventor: Saiman Lun, Centerville, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/634,244

(22) Filed: Aug. 8, 2000

(51) Int. Cl.7 ................................................. F16F 9/04
(52) U.S. Cl. ............................... 267/64.21; 267/64.19; 267/64.23; 267/64.27; 267/122; 267/64.13; 267/64.25; 267/218
(58) Field of Search ................. 267/64.19, 64.21, 267/64.24, 64.23, 64.27, 64.15, 122, 64.13, 64.25, 218, 201, 217, 219, 220, 35, 141, 292

(56) References Cited

U.S. PATENT DOCUMENTS

| | | | | |
|---|---|---|---|---|
| 4,434,977 A | * | 3/1984 | Chiba et al. | 267/35 |
| 4,462,608 A | * | 7/1984 | Lederman | 267/35 |
| 4,478,396 A | * | 10/1984 | Kawaura | 267/35 |
| 4,555,096 A | * | 11/1985 | Pryor | 267/64.21 |
| 4,592,540 A | * | 6/1986 | Yokoya et al. | 267/35 |
| 4,671,323 A | * | 6/1987 | Buma | 267/64.21 |
| 4,712,776 A | * | 12/1987 | Geno et al. | 267/64.21 |
| 4,796,870 A | * | 1/1989 | Hoffman et al. | 267/35 |
| 4,828,232 A | * | 5/1989 | Harrod et al. | 267/64.24 |
| 4,989,844 A | * | 2/1991 | Wijnhoven et al. | 267/64.24 |
| 5,009,401 A | * | 4/1991 | Weitzenhof | 267/64.21 |
| 5,078,370 A | * | 1/1992 | McClellan | 267/220 |
| 5,112,077 A | * | 5/1992 | Makita | 267/220 |
| 5,308,048 A | * | 5/1994 | Weaver et al. | 267/220 |
| 5,362,035 A | * | 11/1994 | Carter | 267/220 |
| 5,669,597 A | * | 9/1997 | Rittstieg et al. | 267/64.17 |
| 5,676,355 A | * | 10/1997 | Hayashi et al. | 267/221 |
| 5,690,319 A | * | 11/1997 | Robinson et al. | 267/64.19 |
| 6,182,953 B1 | * | 2/2001 | Smith et al. | 267/220 |

* cited by examiner

Primary Examiner—Christopher P. Schwartz
Assistant Examiner—Devon Kramer
(74) Attorney, Agent, or Firm—Robert M. Sigler

(57) ABSTRACT

An air lift shock absorber for an automotive suspension system includes a damping piston slidable within a housing, a piston rod extending from the housing to a top mount assembly including a rigid top mount housing and a force absorbing member within the housing for transferring damping forces from the piston to the top mount housing. A jounce bumper absorbs impact forces from the housing. An air lift mechanism includes an inflatable sleeve and a pressure retainer connecting the inflatable sleeve with a flexible force receiving member that is bonded to the pressure retainer and to the top mount housing. The flexible force receiving member allows the pressure retainer to flex relative to the top mount during normal operation of the suspension system and also provides a force transmitting path for transferring forces from the air lift mechanism and the jounce bumper to the top mount housing independent of the resilient force absorbing member within the top mount housing that transfers damping forces.

8 Claims, 1 Drawing Sheet

SHOCK ABSORBER WITH FLEXIBLE CONNECTION BETWEEN AN AIRLIFT COMPONENT AND TOP MOUNT

TECHNICAL FIELD

This invention relates to an airlift shock absorber having an inflatable air sleeve to adjust the riding height of the vehicle upon which the shock absorber is mounted.

BACKGROUND OF THE INVENTION

Modern motor vehicles have suspension system, which include shock absorbers to control the relative movements of the vehicle chassis with respect to the vehicle body. These shock absorbers commonly include a housing and a piston assembly. The piston assembly includes a piston and a piston rod extending from the piston. The housing is commonly connected to a vehicle wheel end assembly. The housing is filled with a damping fluid, which is metered across the piston plate to dampen relative movement between the housing and piston assembly. The piston rod includes a portion extending from the top end of the housing, which is connected to the vehicle body through a conventional top mount. A jounce bumper is secured below the top mount to absorb the force of unusually large relative movement between the chassis and body. An airlift shock absorber includes an air sleeve that may be inflated to control the relative positions of the piston assembly and housing, to thereby control the riding height of the vehicle.

In conventional prior art airlift shock absorbers, a pressure retainer is attached and sealed to the piston rod. The damping load transmitted through the piston assembly, any load transmitted through the jounce bumper, and the load generated by the airlift mechanism are all transmitted through the piston rod and into the top mount. This increases noise during normal movements of the suspension system and increases ride harshness due to heavy loading at the top mount.

SUMMARY OF THE INVENTION

According to the present invention, damping forces are transferred through the top mount and airlift forces and forces transferred through the jounce bumper are transferred through a flexible force receiving member bonded to the top mount housing. The assembly isolates the damping forces from the airlift and jounce bumper forces, and also provides a simplified design, thereby reducing component cost and assembly labor. The airlift mechanism includes a rigid pressure retainer which is an integral part of the top mount, being connected to the top mount by a flexible force receiving member which allows the pressure retainer to flex relative to the top mount. This rigid pressure retainer is bonded to the top mount housing through the flexible force receiving member because the pressure retainer is inserted into the mold during the molding process in which the flexible force receiving member is formed and bonded to the top mount housing. The flexible force receiving member provides the seal and the flexibility required between the two components. Damping loads are transmitted through the conventional top mount in the normal manner. Airlift load and load generated by impacts on the jounce bumper are reacted to the vehicle body through a resilient member for added isolation. Accordingly, dual load paths are provided which are independent of, and isolated from, one another. Noise and ride harshness are thereby reduced.

DESCRIPTION OF THE PREFERRED EMBODIMENT

Figures 1, 2:
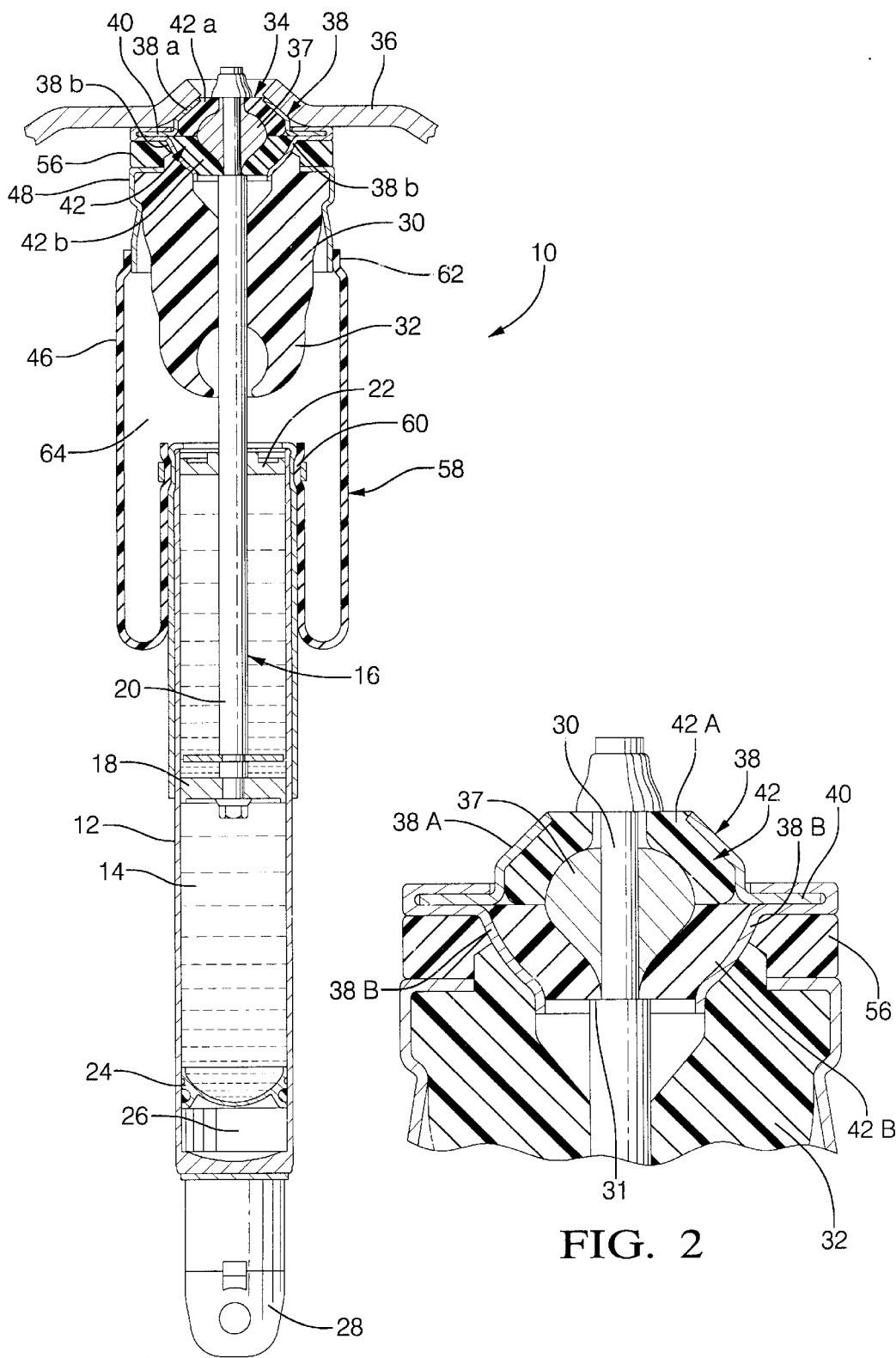
FIG. 1 is a longitudinal cross sectional view taken through a shock absorber made pursuant to the teachings of the present invention.
FIG. 2 is an enlarged, fragmentary cross sectional view of the upper portion of the shock absorber illustrated in FIG. 1.

Referring now to the drawings, an airlift shock absorber generally indicated by the numeral 10 includes a housing 12 defining a damping chamber 14 therewithin which is filled with damping fluid. A piston assembly generally indicated at 16 includes a damping piston 18 and a piston rod 20, which extends from the piston 18 through the upper end 22 of the housing 12. Damping fluid within the chamber 14 is metered across the piston 18 in a manner well known to those skilled in the art to dampen the relative movement between the housing 12 and the piston assembly 16. A gas cup 24 is slidably mounted within the housing 12 and separates the damping chamber 14 from a compensating chamber 26, which is charged with gas under pressure to move the gas cup 24 within the housing 12 to compensate for the change in volume of the damping chamber 14 in response to extension and retraction of the piston rod 20 with respect to the housing 12, and also to compensate for any change in volume of the damping fluid due to temperature changes, fluid loss, etc. A bottom mount 28 is secured to the lower end of the housing 12 and is adapted to secure the housing 12 to a chassis component such as a vehicle wheel end assembly (not shown) in a conventional manner.

The piston rod 20 extends through a conventional jounce bumper generally indicated at 32, which circumscribes the piston rod 20. The jounce bumper 32 is made of a resilient material, and absorbs the force of the housing 12 impacting upon the jounce bumper 32. These impact forces are due to especially large magnitude movements of the housing 12, caused by, for example, movement of the vehicle upon which the shock absorber 10 is used on a particularly rough road at a relatively high speed. The piston rod 20 includes a reduced diameter portion 30 which cooperates with the larger diameter portion of piston rod 20 to define a shoulder 31 therebetween. The reduced diameter portion 30 extends through a conventional top mount 34. Top mount 34 abuts and attaches to the body of the vehicle indicated by the numeral 36. The top mount 34 includes a top mount housing 38 having a radially outwardly projecting, circumferentially extending flange 40, which joins the two halves of top mount housing sections 38a, 38b. A resilient force absorbing member 42 consists of inserts 42a, 42b surrounding and engaging a generally ball shaped member 37 mounted on the portion 30 of piston rod 20 and which are engaged by the shoulder 31. The piston rod 20 extends into the vehicle body 36 and is secured thereto by a conventional fastener.

The shock absorber 10 is provided with an airlift mechanism 58 consisting of an inflatable air sleeve 46 and a pressure retainer 48. The relative positions of the housing 12 and piston assembly 16 may be changed by changing air pressure within the air sleeve 46 to thereby change the riding height of the vehicle to compensate for particularly heavy loads, for example. A resilient force absorbing member 56 is bonded between the pressure retainer 48 and the top mount housing 38b to provide a seal and the flexibility required between the pressure retainer 38 and housing section 38b. This resilient force absorbing member 56 also provides isolation from noise and impact harshness. Impact forces transferred through the jounce bumper 32 are also transferred through the resilient force absorbing member 56 through cooperating surfaces on the jounce bumper and the flexible force receiving member.

One end 60 of the air sleeve 46 circumscribes the upper end 22 of the housing 12 and is attached thereto by a conventional fastener to form a pressure retaining seal therebetween. The other end 62 of the air sleeve 46 circumscribes the pressure retainer 48 and is attached thereto by a conventional fastener to form a pressure retaining seal therebetween. Accordingly, the air sleeve 46, the pressure retainer 48, the upper end 22 of the housing 12, and the top mount 34 cooperate to define a pressure retaining cavity 64. The portion 30 is sealed to the inner insert 42b by shoulder 31 to complete the airtight cavity 64. Compressed air is introduced into, and released from, the cavity 64 through a conventional fitting (not shown).

In operation, the shock absorber 10 dampens relative movement between the body and chassis of the vehicle by metering the damping fluid within chamber 14 across the piston 18 to thereby dampen the relative movement between the piston rod 20 and housing 12, which are respectively connected to the body and chassis of the vehicle. The dampening forces applied to the piston assembly 16 by this normal operation of the shock absorber 10 are transmitted through the force absorbing member 42 of the top mount 34 and from there to the vehicle body. As discussed above, the relative positions of the housing 12 and piston assembly 16 may be adjusted to control the riding height of the vehicle by introducing compressed air into (or releasing compressed air from) the cavity 64. Accordingly, when compressed air is introduced into the cavity 64, airlift forces are applied at the bottom of the top mount 34 through the resilient force absorbing member. Similarly, impact forces applied directly to the jounce bumper by engagement with the jounce bumper of end 22 of the housing 12 during severe relative movement between the chassis and the body will also be transmitted to the vehicle body 36 through the resilient force absorbing member 56 through cooperating surfaces on the jounce bumper 32 and the resilient force absorbing member 56 and then to the top mount housing 38.

Accordingly, dual independent, isolated, force transmitting paths are provided to transmit suspension forces to the vehicle body 34. The damping forces which are generated by metering the damping fluid across the piston 18, are transmitted through a first force transmitting path through the piston rod 20 and the force absorbing member 42 of the top mount 34. The air lift forces, and the forces generated by impact of the housing 12 on the jounce bumper 32, are taken through a second force transmitting path through the resilient force absorbing member 56 and the top mount housing 38, thus isolating the forces due to air lift and impact with the jounce bumper from the normal damping forces.

What is claimed is:

1. Air lift shock absorber for an automotive suspension system comprising:

a damper housing filled with damping fluid;

a piston assembly slidable within the damper housing and including a piston rod having a portion extending from one end of the damper housing, the damper housing and said piston assembly being movable relative to one another to dampen relative movement therebetween;

a top mount having a housing adapted to abut a vehicle body and containing and engaging a first resilient force absorbing member also engaging the portion of the piston rod, the first resilient force absorbing member defining a first force transmitting path transferring damping forces from the piston rod to the housing of the top mount;

an air lift mechanism for adjusting the position of the damper housing relative to the piston assembly, the air lift mechanism including a flexible sleeve sealingly connected to the damper housing and a pressure retainer extending between the sleeve and a second resilient force absorbing member connected to the housing of the top mount, a resilient jounce bumper connected to the pressure retainer and adapted to dampen impact forces from the damper housing, the second resilient force absorbing member thus defining a second force transmitting path transferring damping forces from the air lift mechanism and the jounce bumper to the housing of the top mount independently of the first resilient force absorbing member and the first resilient force absorbing member transferring damping forces from the piston rod to the housing of the top mount independently of the second resilient force absorbing member and the pressure retainer.

2. The air lift shock absorber of claim 1 wherein the housing of the top mount comprises a radially outwardly projecting, circumferentially extending flange and the second resilient force absorbing member is coupled axially to the bottom of the flange, radially outward of the first resilient force absorbing member.

3. The air lift shock absorber of claim 2 in which the housing of the top mount comprises first and second members joined in the flange.

4. The air lift shock absorber of claim 1 in which the first resilient force absorbing member is contained within the housing of the top mount and the second resilient force absorbing member is outside the housing of the top mount.

5. Vehicle suspension apparatus comprising:

an air lift suspension damper having a housing filled with damping fluid;

a piston assembly slidable within the damper housing and including a piston rod having a portion extending from one end of the damper housing, the damper housing and said piston assembly being movable relative to one another to dampen relative movement therebetween;

a top mount having a housing abutting a portion of a vehicle body and containing and engaging a first resilient force absorbing member also engaging the portion of the piston rod, the first resilient force absorbing member defining, with the housing of the top mount, a first force transmitting path transferring damping forces from the piston rod to the vehicle body;

an air lift mechanism for adjusting the position of the damper housing relative to the piston assembly, the air lift mechanism including a flexible sleeve sealingly connected to the damper housing and a pressure retainer extending between the sleeve and a second resilient force absorbing member connected to the housing of the top mount, a resilient jounce bumper connected to the pressure retainer and adapted to dampen impact forces from the damper housing, the second resilient force absorbing member thus defining, with the housing of the top mount, a second force transmitting path transferring damping forces from the air lift mechanism and the jounce bumper to the vehicle body independently of the first resilient force absorbing member and the first resilient force absorbing member transferring damping forces from the piston rod to the vehicle body, through the housing of the top mount, independently of the second resilient force absorbing member and the pressure retainer.

6. The vehicle suspension apparatus of claim 5 wherein the housing of the top mount comprises a radially outwardly projecting, circumferentially extending flange abutting the portion of the vehicle body and the second resilient force absorbing member is coupled axially to the bottom of the flange, radially outward of the first resilient force absorbing member.

7. The air lift shock absorber of claim 6 in which the housing of the top mount comprises first and second members joined in the flange.

8. The air lift shock absorber of claim 5 in which the first resilient force absorbing member is contained within the housing of the top mount and the second resilient force absorbing member is outside the housing of the top mount.

* * * * *